United States Patent [19]
Sato

[11] Patent Number: 5,805,749
[45] Date of Patent: Sep. 8, 1998

[54] HIGHLY STABLE PHOTORECEIVER

[75] Inventor: Yoshinori Sato, Tokyo, Japan

[73] Assignee: Ando Electric Co., Ltd., Tokyo, Japan

[21] Appl. No.: 816,834

[22] Filed: Mar. 13, 1997

[30] Foreign Application Priority Data

Mar. 25, 1996  [JP]  Japan .................................. 8-094929

[51] Int. Cl.⁶ ................................................ G02B 6/32
[52] U.S. Cl. ............................... 385/34; 385/31; 385/33; 385/36
[58] Field of Search ................................. 385/37, 34, 31, 385/39; 359/131, 127

[56] References Cited

U.S. PATENT DOCUMENTS 5,276,747  1/1994  Pan ............................................ 385/34
5,446,813  8/1995  Lee et al. .................................. 385/36
5,689,359  11/1997  Kurata et al. ............................. 385/34

*Primary Examiner*—Phan T. H. Palmer
*Attorney, Agent, or Firm*—Flynn, Thiel, Boutell & Tanis, P.C.

[57] ABSTRACT

A photoreceiver designed to suppress interference attributable to multiple reflection comprises an optical fiber, a light receiving device, a first gradient index lens having flat entrance and exit surfaces and disposed with its optical axis inclined to the optical axis of the photoreceiver, and a second gradient index lens having flat entrance and exit surfaces and disposed with its optical axis inclined to the optical axis of the photoreceiver. The first gradient index lens collimates light rays emitted through the optical fiber and the second gradient index lens focuses collimated light rays received from the lens on the light receiving surface of the light receiving device.

9 Claims, 3 Drawing Sheets

ENTRANCE SURFACE
OF A SECOND LENS
(GRADIENT INDEX LENS)

ENTRANCE SURFACE
OF A SECOND LENS
(HEMISPHERICAL LENS)

HIGHLY STABLE PHOTORECEIVER

BACKGROUND OF THE INVENTION

1. Field of the Invention

The present invention relates to a highly stable photoreceiver and, more specifically, to a highly stable photoreceiver capable of suppressing internal interference and polarization dependence.

2. Description of the Related Art

A photoreceiver, which includes a first lens for collimating light rays emitted through an optical fiber in parallel light rays and a second lens for focusing the parallel rays on a light receiving device, has been employed in an optical communication system for receiving optical power and measuring the optical power.

Referring to FIG. 5 showing, in a schematic plan view, such a conventional photoreceiver, a lens 2 for collimating light rays emitted through an optical fiber 1 is a gradient index lens having a flat entrance surface and a flat exit surface, and a lens for focusing the light rays collimated by the lens 2 on the light receiving surface of a light receiving device 4 is a plano-convex lens having a convex entrance surface and a flat exit surface. The size of the aperture of the lens 7 is about 1.5 times that of the lens 2 to focus all the light rays collimated by the lens 2. The light receiving surface of the light receiving device 4 is inclined to the optical axis 5 of the photoreceiver to avoid the entrance of reflected light rays 8 reflected by the light receiving surface of the light receiving device 4.

In this conventional photoreceiver, the entrance and the exit surface of the lens 2 are perpendicular to the optical axis of the lens 2, the exit surface of the lens 7 is perpendicular to the optical axis of the lens 7, and the entrance surface of the lens 7 is convex. Light emitted through the optical fiber 1 is reflected by those four surfaces of the lenses 2 and 7, and part of the light is reflected onto the optical fiber 1. Consequently, interference occurs in the photoreceiver due to multiple reflection, deteriorating the stability of optical power measurement. Naturally, interference results from the superposition of two or more waves having the same wavelength; that is, interference results from the confrontation of two or more reflecting surfaces. Generally, interference can be suppressed if return loss is increased. However, since the lens 7 is a hemispherical lens having a convex entrance surface, as is obvious from FIG. 6, the return loss is 60 dB or below even if the inclination of the optical axis of the lens 7 is varied. That is, the return of part of the reflected light to the optical fiber 1 is unavoidable because the quantity of the reflected light changes scarcely even if the optical axis of the lens 7 is inclined at any inclination. Since the light receiving surface of the light receiving device 4 is inclined to the optical axis 5 of the photoreceiver, the photoreceiver is unable to suppress polarization dependence satisfactorily, and polarization dependence is a serious obstruction to highly stable measurement of optical power.

SUMMARY OF THE INVENTION

According to one aspect of the present invention, a photoreceiver comprises an optical fiber (1), a light receiving device (4), a first gradient index lens (2) having flat entrance and exit surfaces and disposed with its optical axis inclined to the optical axis of the photoreceiver to collimate light rays, and a second gradient index lens (3) having flat entrance and exit surfaces and disposed with its optical axis inclined to the optical axis of the photoreceiver to focus the collimated light rays received from the lens (2) on the light receiving surface of the light receiving device (4).

According to another aspect of the present invention, a photoreceiver comprises an optical fiber (1), a light receiving device (4), a first lens (2) disposed with its optical axis included in a plane including the optical axis of the light receiving device (4) to collimate light rays emitted through the optical fiber (1), a second lens (3) disposed with its optical axis included in the plane including the optical axis of the light receiving device (4) to focus the collimated light rays received from the first lens (2) on the light receiving surface of the light receiving device (4), and a wedge plate (6) disposed between the first lens (2) and the second lens (3) and included in a plane perpendicular to the plane including the optical axis of the light receiving device (4).

According to the first aspect of the present invention, the lenses (2. 3) and the light receiving device (4) are disposed with their optical axes inclined to the optical axis (5) of the photoreceiver, light rays emitted through the optical fiber (1) are collimated by the first gradient index lens (2) having the flat entrance and the flat exit surface, and the second gradient index lens (3) having the flat entrance and the flat exit surface focuses the collimated light rays received from the first gradient index lens (2) on the light receiving surface of the light receiving device (4). Thus, interference attributable to multiple reflection can be suppressed.

According to the second aspect of the present invention, the lenses (2, 3) are disposed with their optical axes included in a plane including the optical axis of the light receiving device (4), the wedge (6) is interposed between the lenses (2, 3) with its axis included in a plane perpendicular to the plane including the optical axis of the light receiving device (4), the first lens (2) collimates the light rays emitted through the optical fiber (1), and the second lens (3) focuses the collimated light rays received through the wedge (6) from the first lens (2) on the light receiving surface of the light receiving device (4). Thus, polarization dependence can be suppressed.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

A photoreceiver in a first embodiment according to the present invention will be described with reference to FIGS.

Figure 5:
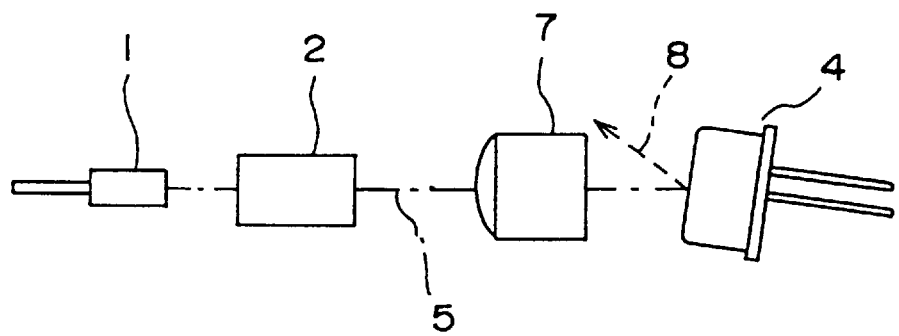
FIG. 5 is a schematic plan view of a conventional photoreceiver.
Figure 6:
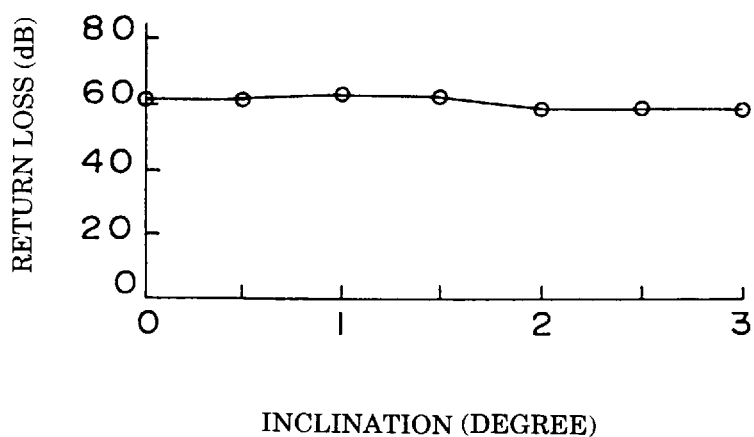
FIG. 6 is a graph showing the variation of return loss with the inclination of the entrance surface of a hemispherical lens of a conventional photoreceiver of FIG. 5.

1 and 2, in which parts like or corresponding to those shown in FIGS. 5 and 6 are designated by the same reference characters.

The photoreceiver comprises an optical fiber 1, a first lens 2 having a flat entrance surface and a flat exit surface, i.e., a gradient index lens, a second lens 3 having a flat entrance surface and a flat exit surface, i.e., a gradient index lens, and a light receiving device 4. The optical fiber 1, the lenses 2 and 3, and the light receiving device 4 are similar to those of the conventional photoreceiver shown in FIG. 5. However, as is obvious from FIG. 1, the lenses 2 and 3, and the light receiving device 4 are disposed with their optical axes inclined to the optical axis of the photoreceiver.

Figure 1:
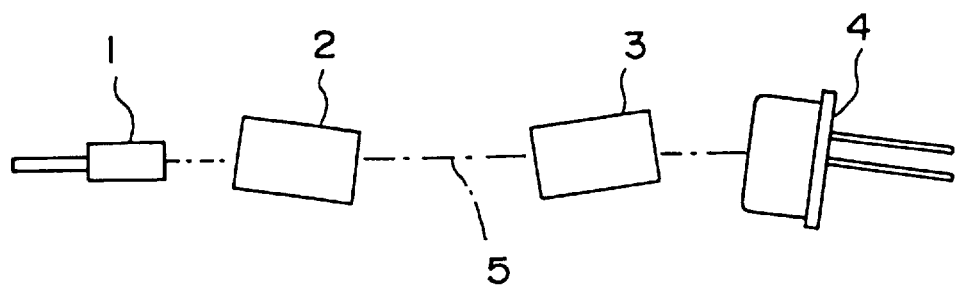
FIG. 1 is a schematic plan view of a highly stable photoreceiver in a first embodiment according to the present invention.
Figure 2:
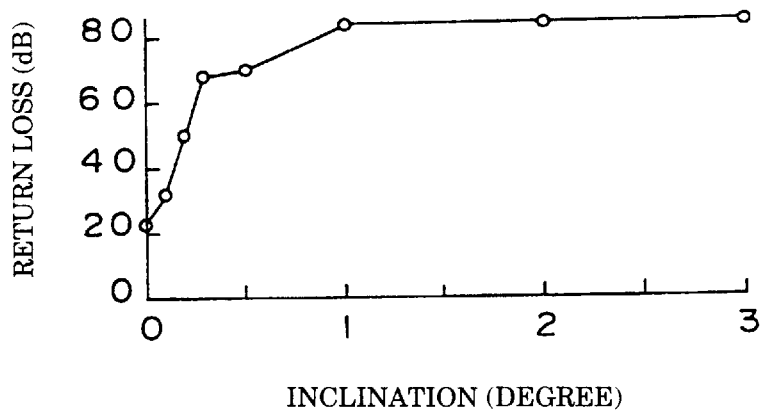
FIG. 2 is a graph showing the variation of return loss with the inclination of the entrance surface of a second lens (gradient index lens) included in the photoreceiver of FIG. 1.

The optical actions of the photoreceiver shown in FIG. 1 will be described with reference to FIG. 2 showing the dependence of return loss on the inclination of the optical axis of the lens 3. The first lens 2 collimates light emitted through the optical fiber 1 in collimated light rays, and the second lens 3 focuses the collimated light rays received from the first lens 2 on the light receiving surface of the light receiving device 4. Since both the lenses 2 and 3 are gradient index lenses each having a flat entrance surface and a flat exit surface, the return loss caused by the entrance surface of the second lens 3 is about 20 dB if the optical axis of the second lens 3 is parallel to the optical axis of the photoreceiver, i.e., if the inclination of the optical axis of the second lens 3 to the optical axis of the photoreceiver is 0°, as shown in FIG. 2, because the collimated light rays fall perpendicularly to the entrance surface of the second lens 3 and hence the quantity of light reflected from the entrance surface of the second lens 3 toward the optical fiber 1 attains a maximum if the inclination of the optical axis of the second lens 3 to the optical axis of the photoreceiver is 0°. In such a state, the degree of multiple reflection attains a maximum, and marked interference occurs. If the return loss is increased, then interference can be suppressed accordingly. If the second lens 3, i.e., a gradient index lens, is disposed with its optical axis inclined to that of the photoreceiver, the quantity of reflected light reflected on the optical fiber 1 is reduced. The return loss is about 70 dB when the inclination of the optical axis of the second lens 3 is 0.5°, and about 80 dB or above when the inclination of the optical axis of the second lens 3 is 1° or above. The optical axis of the second lens 3 may be inclined to that of the photoreceiver in any direction.

Figure 3:
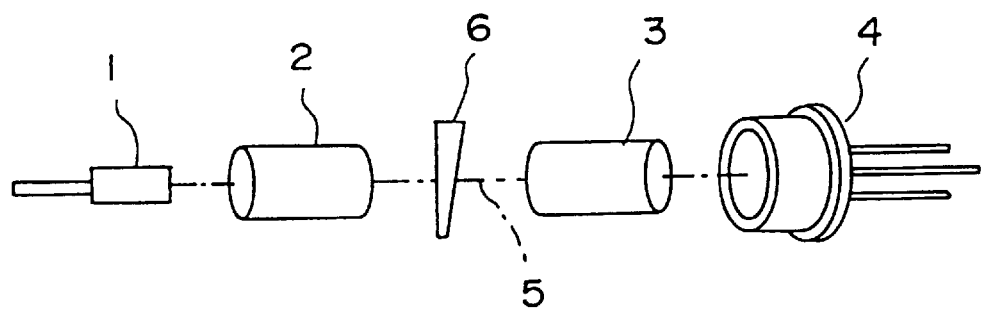
FIG. 3 is a schematic plan view of a highly stable photoreceiver in a second embodiment according to the present invention.
Figure 4:
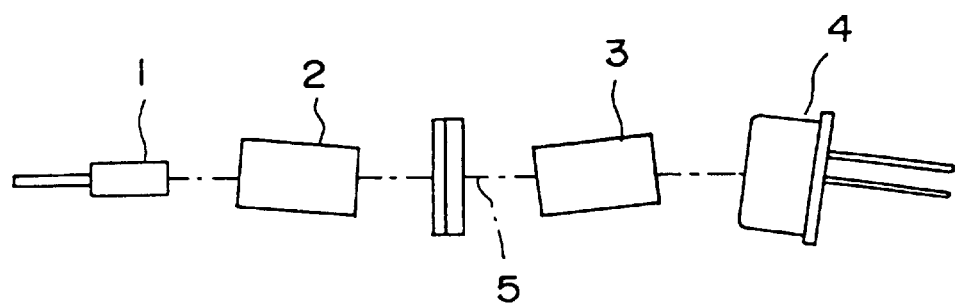
FIG. 4 is a schematic side view of the photoreceiver of FIG. 3.

A photoreceiver in a second embodiment according to the present invention will be described with reference to FIGS. 3 and 4. The photoreceiver in the second embodiment comprises an optical fiber 1, a first lens 2 disposed behind the optical fiber 1, a second lens 3, a light receiving device 4 disposed behind the second lens 3, and a wedge 6 interposed between the lenses 2 and 3. The respective optical axes of the lenses 2 and 3 and the light receiving device 4 are inclined to the optical axis of the photoreceiver in the same plane, and the wedge 6 is disposed in a plane perpendicular to the plane including the optical axis of the light receiving device 4. This arrangement of the component parts of the photoreceiver suppresses polarization dependence. The respective optical axes of the lenses 2 and 3 and the light receiving device 4 are inclined to the optical axis of the photoreceiver in the same vertical plane to match the respective directivities of polarization dependence thereof. The wedge 6 is disposed inclining in a direction to nullify polarization dependence.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A photoreceiver for receiving and measuring optical power, said photoreceiver comprising:

an optical fiber defining an optical axis of said photoreceiver;

a light receiving device having a light receiving surface disposed thereon;

a first gradient lens for collimating light rays emitted by said optical fiber and having an optical axis and flat entrance and exit surfaces parallel to one another and perpendicular to the optical axis of said first lens, said first lens being disposed such that its optical axis is inclined with respect to the optical axis of said photoreceiver; and a second gradient lens disposed to focus collimated light rays received from said first lens onto said light receiving surface, said second lens having an optical axis and flat entrance and exit surfaces parallel to one another and perpendicular to the optical axis of said second lens, said second lens being disposed such that its optical axis is inclined with respect to the optical axis of said photoreceiver, and said entrance and exit surfaces of said second lens being disposed in a non-parallel relationship with said entrance and exit surfaces of said first lens to suppress interference caused by reflection of light rays emitted by said optical fiber back to said optical fiber.

2. The photoreceiver of claim 1 wherein said first lens is disposed between said optical fiber and said second lens such that said first lens collimates light rays received directly from said optical fiber, and said second lens is disposed between said first lens and said light receiving device such that said second lens focuses collimated light rays received from said first lens directly onto said light receiving surface.

3. The photoreceiver of claim 1 further including a wedge-shaped plate disposed between said first and second lenses to suppress polarization dependence.

4. The photoreceiver of claim 1 wherein said light receiving device has an optical axis and is disposed such that its optical axis is inclined with respect to the optical axis of said photoreceiver.

5. The photoreceiver of claim 1 wherein said second lens is disposed such that its optical axis is inclined with respect to the optical axis of said photoreceiver at an angle of 0.50° or greater.

6. A photoreceiver for receiving and measuring optical power, said photoreceiver comprising:

an optical fiber defining an optical axis of said photoreceiver;

a light receiving device having a light receiving surface disposed thereon;

a first lens for collimating light rays emitted by said optical fiber and having an optical axis and flat entrance and exit surfaces parallel to one another and perpendicular to the optical axis of said first lens;

a second lens disposed to focus collimated light rays received from said first lens onto said light receiving surface, said second lens having an optical axis and flat entrance and exit surfaces parallel to one another and perpendicular to the optical axis of said second lens;

said entrance and exit surfaces of said second lens being disposed in a non-parallel relationship with said entrance and exit surfaces of said first lens to suppress interference caused by reflection of light rays emitted by said optical fiber back to said optical fiber;

said first and second lenses being disposed such that their corresponding optical axes are inclined with respect to the optical axis of said photoreceiver, the optical axes of said first and second lenses lying in a common plane with the optical axis of said photoreceiver; and a wedge-shaped plate disposed between said first and second lenses, said wedge-shaped plate having a flat surface adjacent and facing said first lens and disposed perpendicular to the common plane including the optical axes of said photoreceiver and said first and second lenses to suppress polarization dependence.

7. The photoreceiver of claim 6 wherein said first lens is disposed between said optical fiber and said flat surface of said wedge-shaped lens such that said first lens collimates light rays received directly from said optical fiber, and said second lens is disposed between said inclined surface of said wedge-shaped plate and said light receiving device such that said second lens focuses collimated light received from said first lens directly onto said light receiving surface.

8. The photoreceiver of claim 6 wherein said light receiving device has an optical axis and is disposed such that its optical axis is inclined with respect to the optical axis of said photoreceiver and lies in the common plane including the optical axes of said photoreceiver and said first and second lenses.

9. The photoreceiver of claim 6 wherein said wedge-shaped plate comprises an inclined surface opposite said flat surface and facing said second lens to suppress polarization dependence.

\* \* \* \* \*

UNITED STATES PATENT AND TRADEMARK OFFICE
CERTIFICATE OF CORRECTION

PATENT NO.  :  5,805,749
DATED       :  September 8, 1998
INVENTOR(S) :  Yoshinori SATO It is certified that error appears in the above-indentified patent and that said Letters Patent is hereby corrected as shown below:

Column 6, line 3; after "light" insert ---rays---.

Signed and Sealed this

Twentieth Day of April, 1999

Attest:

Q. TODD DICKINSON

*Attesting Officer*    Acting Commissioner of Patents and Trademarks